United States Patent

[11] 3,614,154

| [72] | Inventor | Clarton F. Evans<br>Warwick, N.Y. |
|---|---|---|
| [21] | Appl. No. | 43,453 |
| [22] | Filed | June 4, 1970 |
| [45] | Patented | Oct. 19, 1971 |
| [73] | Assignee | International Paper Company<br>New York, N.Y. |

[54] FLEXIBLE SHEET COVER MATERIAL FOR AN OPEN-TOPPED VEHICLE
10 Claims, 6 Drawing Figs.

[52] U.S. Cl. .................................................. 296/137 R,
 296/100
[51] Int. Cl. .................................................. B60j 7/10
[50] Field of Search .................................................. 105/377;
 150/52 R, 5; 296/98, 100, 137 R

[56] References Cited
UNITED STATES PATENTS

| 2,443,478 | 6/1948 | Reid | 296/100 |
| 3,202,454 | 8/1965 | Neidlinger | 296/100 |
| 3,481,371 | 12/1969 | Row | 296/100 |
| 3,521,927 | 7/1970 | Barry | 296/100 |

FOREIGN PATENTS

| 835,408 | 3/1952 | Germany | 296/100 |

*Primary Examiner*—Benjamin Hersh
*Assistant Examiner*—Robert R. Song
*Attorney*—Paul J. Luckern

ABSTRACT: The invention pertains to a novel flexible sheet cover material for an open top vehicle. It also concerns a combination of (1) the vehicle having tiedown cleats or equivalent devices on its sides and (2) the sheet cover material. The cover edges have edge stiffeners which in combination with tiedown cords serve to hold the cover on the vehicle in place.

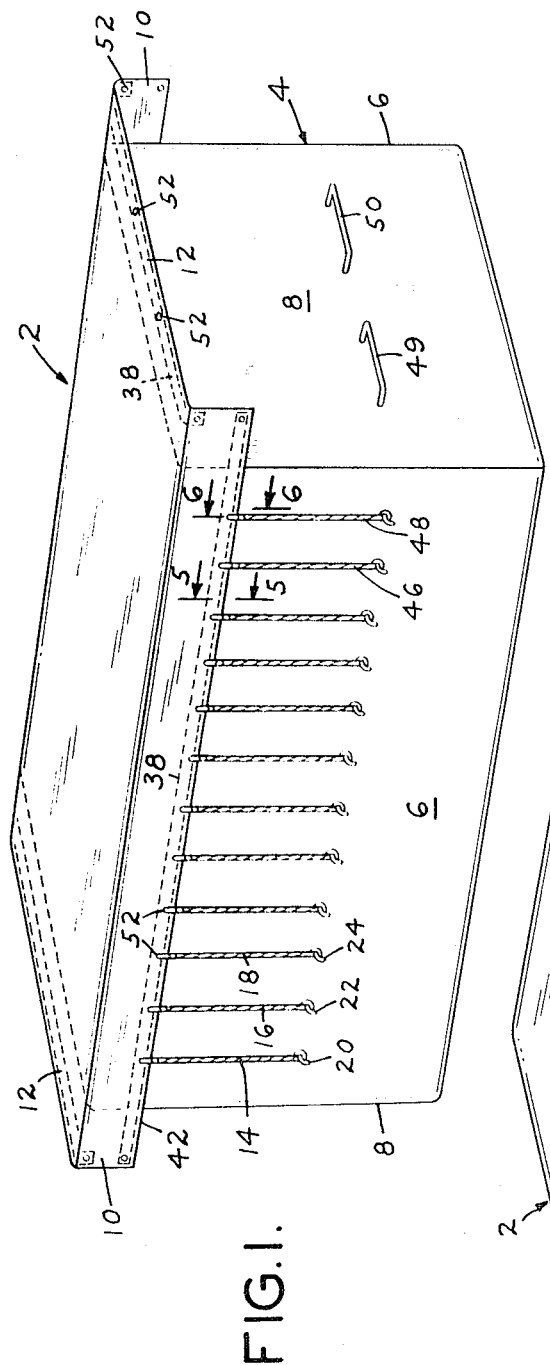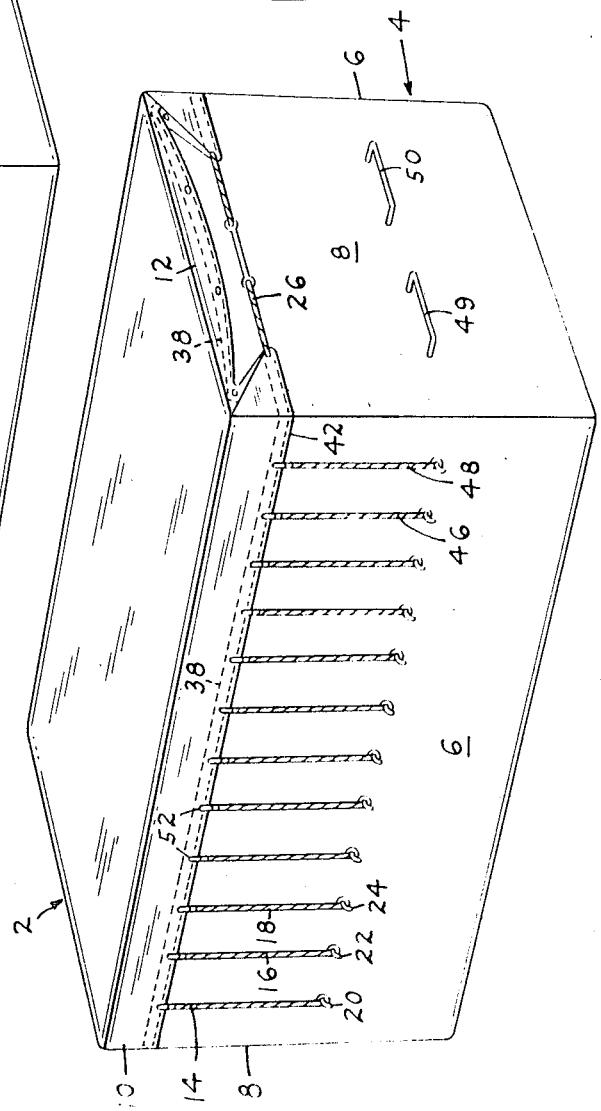

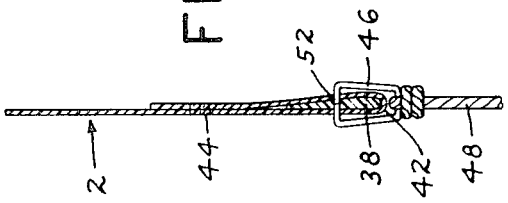
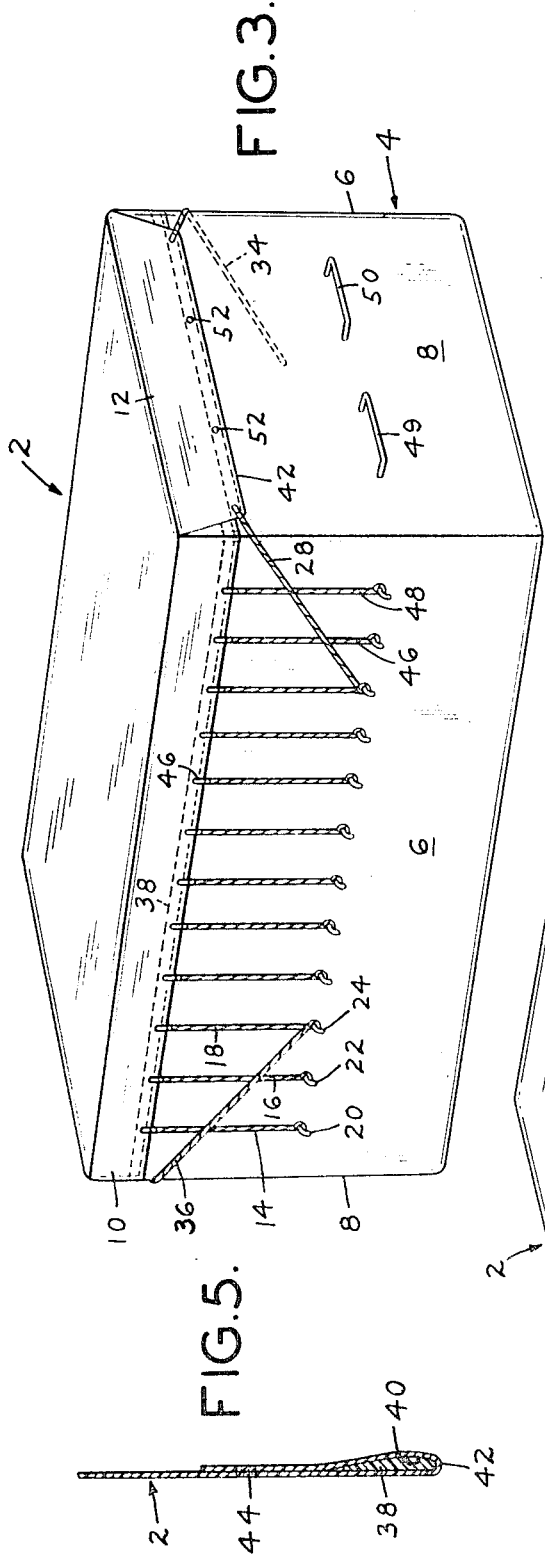
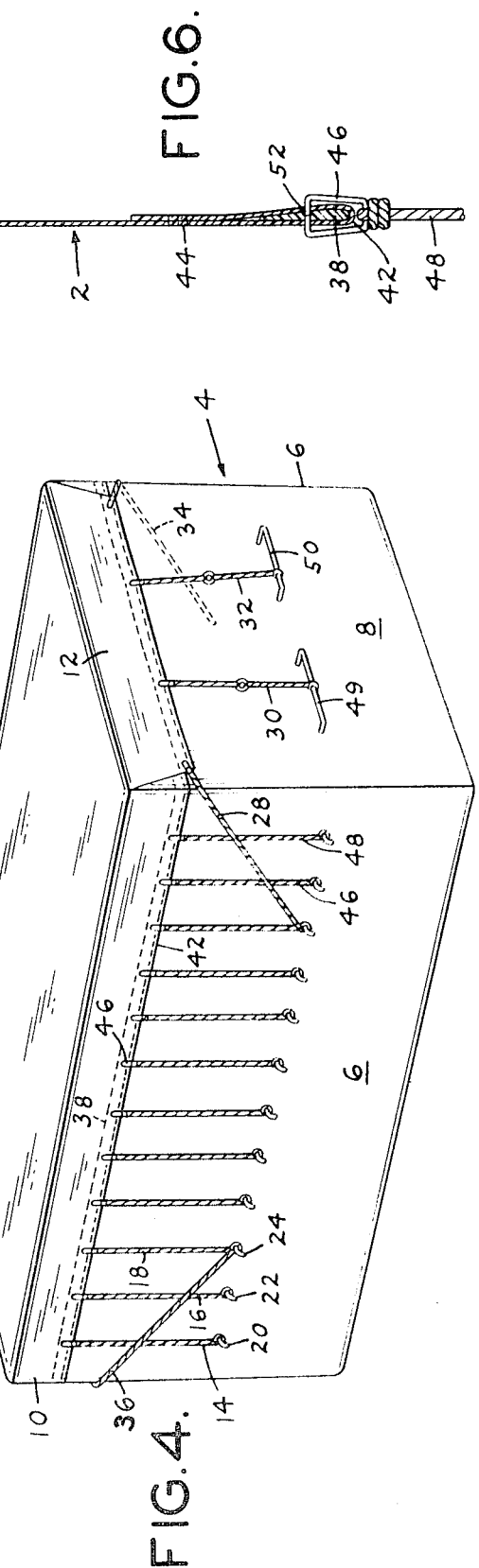

FLEXIBLE SHEET COVER MATERIAL FOR AN OPEN-TOPPED VEHICLE

BACKGROUND OF THE INVENTION

Open-topped trailer bodies have been covered with flexible covers which drape over the sides of the trailer bodies. Tie down straps, that extend beyond the covers, secure the cover to the four sides of the body. Heretofore such covers, especially those made from a thermoplastic or a thin weight paper or thin weight fabric, have had limited utility because of the tendency of wind, at certain transit speeds of the trailer, to tear the cover to pieces.

SUMMARY OF THE INVENTION

I have found the problems of providing a flexible cover strong enough to withstand a wind, at high transit speeds of a trailer body, for example, 75 m.p.h or more, can be solved by providing a flexible cover having unique tie down means. The cover is particularly effective for an open top, particularly an elongated open top, trailer body. In brief, I have found that stiffeners at the cover edges while held under tension in the horizontal position by the tie down cords secured to the stiffeners at fixed points, distribute the stress over a wide area of the cover edges. I further found that my unique tie down means prevents tearing of the cover during transit even when the cover develops slack in the forward area of the vehicle.

BRIEF DESCRIPTION OF THE DRAWINGS

The features of this invention will be understood more fully and clearly from the ensuing description of illustrative embodiments thereof taken in connection with the appended drawings in which:

FIG. 1 is a perspective view of an open topped elongated trailer body with an elongated cover over the top and partially tied (secured);

FIG. 2 is a perspective view of the embodiment of FIG. 1, but with the corners of the cover now tied horizontally to each other;

FIG. 3 is a perspective view of the embodiment of FIG. 1, but with all flaps or drapes of the cover being pulled down;

FIG. 4 is a perspective view of the embodiment of FIG. 1, but with the cover now tied and in place;

FIG. 5 is a cross-sectional view of a portion of the embodiment of FIG. 1 showing the edge of the cover, taken along line 5—5 of FIG. 1;

FIG. 6 is a similar cross-sectional view of a portion of the edge of the cover, taken along line 6—6 of FIG. 1.

DETAILED DESCRIPTION OF THE INVENTION

Referring to the drawings, the preferred embodiment of the invention comprises a sheet material cover 2 covering the top of a trailer body 4 having sidewalls 6 and end walls 8. A draped portion 10 of the cover is at the sidewall 6 of the trailer body and a draped portion 12 is at the end wall 8 of the trailer body. Although FIGS. 1-4 show but one sidewall and one end wall, the same relationship of cover 2 and tie down cords for walls 6 and 8 are found on the corresponding opposite side and end walls (not shown). With conventional piggy back trailer bodies, while the back end wall differs from the front end wall because it can incorporate a door, both ends may be subjected to wind in transit as the railroad flat car becomes turned around in handling at the various switching yards.

Extending from draped portions 10 and 12 are a multiplicity of tie down cords 14, 16, 18, etc., 28, 30, 32, 34 and 36, which are secured to brackets along the sidewalls 6 and end walls 8, e.g., 20, 22, 24, etc., 49 and 50. As shown in FIGS. 1-4, the cover can easily be unrolled on top of a vehicle body and put in place with drapes 10 and 12 of the cover extending over the top edges of the vehicle body. Tie down cord 26 (which may be from a union of two cords from each of the corners) at the end wall secures the corner edges of the cover to each other.

The corners of the cover in turn are covered by pulling the resulting flaps or drapes 12 down at the ends of the vehicle body over the corners to form a neat fold. Then the drapes by means of tie down cords 28, 30, 32, 34 and 36 are secured to the side and end wall of the vehicle body through means 20, 22, 24, etc., 49 and 50 as shown in FIG. 4. The exact number of tie down cords for any cover will depend on the length and width of the cover.

A section of a typical edge of the cover is seen in FIG. 5. A transversely elongated edge stiffener 38 is confined within pocket 40 developed by folding under an edge portion 42 of the cover 2 and sealing, i.e., fusing integrating portions of the cover together by heat, or with an adhesive as at 44. In like manner edge stiffeners 38 are secured to the cover edges at the end walls 8 of the trailer body 4.

A section of a typical edge of the cover having a tie down cord is seen in FIG. 6. FIG. 6 shows a ring 46, e.g., a "pig ring" which is clinched through the mid or lower half of the edge stiffener 38. Each tie down cord is attached to the cover by means of a ring through edge stiffeners and similarly located holes 52 in the cover material which have been prepunched through the edge stiffener and cover. Rather than a ring, the tie down cord can be attached to the edge stiffener merely by insertion of the cord through holes made in the edge stiffeners and similarly located cover portions. The latter is preferred for reasons of simplicity and economics.

The material of the edge stiffener should be rigid enough to distribute the stress when the drapes of the cover are held in place by the tie down cords. Preferably the edge stiffener should be flexible enough to be folded in the horizontal position so that the cover can be rolled or folded in a package for storage. The material of the edge stiffener should be rigid enough so as to distribute the strain caused by the tie down cords thus preventing the tendency of the wind at high transit speeds of the trailer to tear the cover to pieces.

A variety of materials can be used for the edge stiffener, e.g., metals, wood e.g., plastics. Preferred materials for the edge stiffener are the tough, semirigid synthetic polymers such as the polyamides and polymers of ethylenically unsaturated monomers. Those polymers are rigid enough to distribute the stress when the cover is held in place by the tie down cords and yet flexible enough to allow the cover to be folded in the horizontal position and rolled up in a package for storage. Polyethylene has been found to be especially suitable as the material for the edge stiffener.

The geometric shape of the edge stiffener can take any form that is manageable, e.g., triangular, rectangular. It is preferred that the edge stiffener should have an elongated thick cross section that has resistance to bending and has the holes for securing the tie down cords, and further that it should have a thin cross section. A thin cross section allows a greater ability for the cover to be rolled up on its edges. Various forms provide that relationship, for example, the tear drop form in FIG. 5. Another illustrative form is the triangle. If it is not desired that the cover be rolled up in a horizontal position, a thin cross section in the edge stiffener is not necessary. It is preferable that the edge stiffener contain smooth corners since sharp corners have a tendency to cut the cover material.

It is not necessary that the edge stiffener extend transversely along the entire edges of the cover. Generally, because of manufacturing of the cover, the edge stiffener does so extend for the most part. It is essential that edge stiffeners extend transversely and uninterrupted along at least portions of the edges of each of the cover sides to secure a multiplicity of evenly spaced tie down cords which in turn are fixed to the sidewalls of the trailer body and further secure the corners of the cover at the end walls. Referring to FIG. 1, although that FIG. shows the edge stiffener along the entire outer side edge, it would be adequate if it extended from the corners to merely beyond tie down cords 46 and 48 on one side and tiedown cords 14 and 16 on the other side. The remaining side tiedown cords could be secured to the cover as shown in FIG. 1 but without any need for an edge stiffener.

It is essential that edge stiffeners extend along the width of the edges of the cover as shown in FIG. 1.

In the illustrative embodiment, the cover 2 is constructed of commercially available black polyethylene having a minimum thickness of 0.012 inches (12 mils). However, as already disclosed, the cover material can be of any flexible lightweight thermoplastic, paper or fabric which may be disposable after a single use. The thickness of the cover can range from 10 to 20 mil. Normally, the flexible material of the cover will vary slightly in thickness over its width, one suitable embodiment measuring 0.013 inches ± 0.002 inch. The tensile strength of a conventional cover sheet is 1,125 p.s.i. and the tear propagation amounts to 8.0 pounds according to ASTM-D-1938-62$t$. For a typical piggy back trailer, the cover is about 44 feet long and about 11 feet wide. Tiedown cords can be of conventional twine from a number of elongated fibers arranged in side-by-side relation and terminated together to form strips.

In the illustrative embodiment of FIGS. 1-4, which is drawn to a cover of about 44 feet long and about 11 feet wide, tiedown cords 14, 16, 18, etc., are each about 2 feet apart. The distance between the corner ends of the cover and the first tie down cord on the sidewall, e.g., 48, is about 3½ feet. The distance between each of the end tiedown cords, e.g., 28, 30, 32 and 34, is about 29 inches. Each of the tiedown cords with the exception of the end cords which overlap the sides, i.e., 28, 36 and 34, is about 7 feet, 6 inches long. The tiedown cords, which overlap the sides of the trailer body are each about 10 feet, 6 inches long. The distance between each of the corner ends of the cover and the first tiedown cords at the body end, e.g., 28 or 34 or 36, is about 19½ inches. The edge stiffener 38 is about 1 inch in height. The drapes of the cover, e.g. (i.e., the extent of overdrop) 10 and 12, are each about 18 inches long. These dimensions are dependent on the cover size and accordingly will vary. Moreover, the dimensions can vary with a fixed cover size. For example, it is advantageous to employ shock cords in conjunction with the twine cords. Shock cords are elastic in nature, e.g., rubber has been used in shock cords. For example, the end tiedown cords, e.g., 30 and 32 and 26 may consist of a tiedown cord of 4 to 5 feet made of twine and a shock cord of about 2 to 3 feet made of elastic material. Shock cords with a minimum of a 5 inch stretch are particularly effective and ensure a tight or snug fit of the cover on the trailer body.

The particular location at which the tiedown cords are attached to the trailer body can be varied. For example, corner tiedown cords 28, 36 and 34 could be attached to the end walls rather than extending to the sidewalls as in FIG. 4.

Tests carried out with the preferred embodiment using a thermoplastic polyethylene cover of the corresponding size but with, and without, the unique combination of tiedown cords and edge stiffener show that at transit speeds of 75 m.p.h., the wind has a tendency to tear the cover not containing the combination of tiedown cords and edge stiffener.

In a preferred embodiment cords containing as elastic material, e.g., rubber and known as shock cords have been used.

Although FIGS. 1-6 relate to a standard piggy back trailer, my cover may be used with small trailers, as well as with trailers of varying shapes so long as the above described relationship of edge stiffener and tiedown cords exist.

While in the foregoing specification a detailed description of an embodiment of the invention has been set down for the purpose of illustration, many variations of the details herein given may be made by those skilled in the art without departing from the spirit and scope of the invention.

What is claimed is:

1. In combination with an open top vehicle having tiedown means on both sides and end walls thereof for securing tiedown means extending outwardly from drapes of a flexible cover closing said open top, the improved cover characterized by the fact that it includes:

flexible sheet of a thickness in the range of about 0.008 to 0.025 inches dimensioned so as to overlap said open top to provide draped portions along each of the side and end walls of the vehicle body, edge stiffeners extending transversely for at least a portion of each of the cover edges at the sidewalls, edge stiffeners extending transversely for at least a portion of each of the cover edges at the end walls, said edge stiffeners confined within pockets of the cover developed by folding edges of the cover on itself, the folded portions having a lineal area of integration with said cover to provide the pockets, a multiplicity of evenly shaped tiedown cords within the corners of the cover and held to each edge of the cover solely by means of edge stiffeners within the edges of the cover, and further secured to the side and end walls of the vehicle body by tiedown means on the sidewalls and end walls of the vehicle body, further tiedown cords attached to each of the corner edges of the cover by means of edge stiffeners within the corner edges, and further securing the corner edges of the cover to one another at the end walls of the vehicle, said edge stiffeners being rigid enough to distribute the stress as the cover is held in position by the tiedown cords.

2. The structure of claim 1 wherein the tiedown cords are threaded through holes in the edge stiffener and holes similarly located in the cover.

3. The structure of claim 1 wherein the tiedown cords are attached to a ring which in turn is inserted through holes in the edge stiffener and holes similarly located in the cover.

4. The structure of claim 1 wherein the open-topped vehicle is generally rectangular and the edge stiffeners are composed of a plastic.

5. The structure of claim 2 wherein the edge stiffener is composed of a polyethylene.

6. The structure of claim 2 wherein the edge stiffener is composed of a polyamide.

7. The structure of claim 2 wherein the edge stiffeners completely surround the outer edges of the cover.

8. The structure of claim 1 wherein the tiedown cords include shock cords.

9. The structure of claim 1 wherein the elongated sheet is composed of polyethylene.

10. The structure of claim 1 wherein the edge stiffeners are flexible enough to permit the cover to be folded in the horizontal position for storage.